US006755996B1

(12) United States Patent
Greshes

(10) Patent No.: US 6,755,996 B1
(45) Date of Patent: Jun. 29, 2004

(54) DIRECT MANUFACTURER OF PREFORM FOR COMPRESSION MOLDING

(75) Inventor: Martin Greshes, Deer Park, NY (US)

(73) Assignee: Chrysalis Development Company LLC, East Meadow, NY (US)

( * ) Notice: Subject to any disclaimer, the term of this patent is extended or adjusted under 35 U.S.C. 154(b) by 528 days.

(21) Appl. No.: 09/905,128

(22) Filed: Jul. 13, 2001

(51) Int. Cl.[7] .................................................. B29D 11/00
(52) U.S. Cl. ........................... 264/2.4; 264/2.5; 264/2.2
(58) Field of Search ........................... 264/2.4, 2.5, 2.2, 264/2.7, 322; 425/406, 407

(56) References Cited

U.S. PATENT DOCUMENTS 5,630,967 A * 5/1997 Greshes ...................... 264/2.4
6,015,512 A * 1/2000 Yang et al. .................. 264/2.2

* cited by examiner

*Primary Examiner*—Michael Colaianni
*Assistant Examiner*—Yewebdar Tadesse
(74) *Attorney, Agent, or Firm*—James A. Quinton, Esq.

(57) ABSTRACT

A process for forming a preform for use in compression molding an optical lens is provided. A heated reservoir desirably a thermoplastic extruder is filled with a thermoplastic material. The heated reservoir has a fluid outlet which is located in close proximity to the concave mold. The thermoplastic material, for example, polycarbonate pellets is fluidized in the heated reservoir. A predetermined amount of a fluid thermoplastic material is dispensed from the reservoir outlet onto the outside the edge of a heated concave mold prior to the fluid solidifying so that the fluid makes point or line contact as it first contacts the concave molds. The fluid flows down the sloping wall of the concave mold into the concave mold and forms a blob of material having a greater thickness at the center of the concave mold than at the periphery of the mold. The thermoplastic blob is then allowed to cool below its melting temperature. A monolithic preform mass is formed having a skin and having a flat to slightly convex surface which will make point or line contact with the top convex mold.

24 Claims, 6 Drawing Sheets

10
14
12
18
16
10
A
18
12
10
12
18

26
30
30
28
12

DIRECT MANUFACTURER OF PREFORM FOR COMPRESSION MOLDING

BACKGROUND OF THE INVENTION

1. Field of the Invention

The subject invention relates to a method for making preforms for use in compression molding optical articles and a method and apparatus for making optical articles by compression molding.

2. Description of the Prior Art

Prior art compression molding techniques are known in the art. Such techniques can include the use of a preform. See for example U.S. Pat. No. 5,630,967 (Greshes). While such techniques are superior to conventional techniques of grinding and polishing, they suffer from disadvantages. The preforms must be kept scrupulously clean prior to use. In addition, some optical materials such as polycarbonate are hyrgoscopic. Preforms of such materials will emit water bubbles. A polycarbonate preform must be kept in an oven to remove the moisture and prevent the formation of bubbles in the finished lens. This requires having sufficient preforms of various types stored in order to meet the next day's requirements. This can cause additional problems since polycarbonate preforms can discolor due to heat.

Extrusion compression molding processes and apparatus have been proposed. See U.S. Pat. No. 6,015,512 where a polymer strand is delivered from an extruder to a mold. However, the lenses of such process can include entrapped air bubbles. Compression, injection molding processes are also known. See U.S. Pat. No. 4,836,960 (Spector).

SUMMARY OF THE INVENTION

In compression molding techniques, a preform is often used. According to the invention, dirt, entrapped air and moisture free preform is provided for use in compression molding, particularly for compression molding of optical articles, such as ophthalmic lenses or other optical lenses. According to the invention, a method for making a preform from thermoplastic material for use in compression moldings is provided. Convex and concave mold halves are placed in a press. The molds are heated to a temperature above room temperature preferably to about the transition temperature of the thermoplastic material. A thermoplastic material is heated in a reservoir to form a fluid. The thermoplastic material is desirably a thermoplastic resin material, polymethly/methacrylate, polycarbonates, polystyrene, cellulose acetate, acrylic copolymers, thermoplastic polyesters, styrene acrylonitrile (SAN), and/or mixtures thereof. A desirable thermoplastic material for use in the preform is an amorphis cyclolofin copolymer made from monomers of norborene followed hydrogenation for example Zeonor 1020 and 1060 supplied by Zeon Chemical, Louisville, Ky. (hereinafter norborene copolymer).

A heated reservoir desirably a thermoplastic extruder is provided. The heated reservoir has a fluid outlet which is located in close proximity to the concave mold. A thermoplastic material, for example, polycarbonate pellets is fluidized in the heated reservoir. A predetermined amount of a fluid thermoplastic material is dispensed from the reservoir outlet onto the edge of the heated concave mold prior to the fluid solidifying so that the fluid makes point or line contact as it first contacts the concave molds. The fluid flows down the sloping wall of the concave mold into the concave mold and forms a blob of material having a greater thickness at the center of the concave mold than at the periphery of the mold. The thermoplastic blob is then allowed to cool below its melting temperature. A monolithic preform mass is formed having a skin and having a flat to slightly convex surface which will make point or line contact with the top convex mold. The formed preform is clean since it has been produced from clean thermoplastic material that has been melted in the reservoir. In addition, there are substantially no entrapped gas bubbles either from air or from water vapor included in the preform. Such entrapped gases or dirt can result in a defect in the finished lens. Desirably, the reservoir outlet is located as close to the surface of the concave mold as reasonably practical.

In another aspect of the invention, an improved method for rapid on-site manufacture of optical lenses in a few minutes or less is provided. According to the invention, a thermoplastic material is made into an optical lens which is substantially free of dirt, entrapped bubbles, either of air or absorbed moisture or absorbed gases. A convex and concave lens mold are placed in a compression molding press. Desirably, a plurality of presses and associated molds are used. The mold halves are preheated to a temperature above room temperature, preferably to about the transition temperature of the thermoplastic material. A thermoplastic material is heated to form a fluid.

A predetermined amount of the fluid thermoplastic material which has been fluidized in a heated reservoir, is dispensed into the concave mold through an outlet in the reservoir. The outlet is located in close proximity to the concave mold desirably as close as is reasonably feasible to allow the fluid thermoplastic to flow into the mold without building up around the outlet. The fluid thermoplastic material hits the edge of the concave mold prior to the fluid solidifying so that the fluid makes point or line contact as it first contacts the concave mold and flows towards the center of the concave mold to form a blob of thermoplastic material having a greater thickness at the center of the concave mold and a smaller diameter than the resulting molded article. The blob of thermoplastic material is then allowed to cool below its melting temperature at which time it forms a solid skin and forms a monolithic preform mass having a flat to slightly convex surface which will make point or line contact with the convex mold as it is brought down by the press to preclude an entrapment of air and the formation of air bubbles in finished lens. The press is closed and the lens molds are pressed toward one another and against the preform mass so as to mash down the preform mass to form a lens.

It is an object of the invention to form a preform in a compression mold for the manufacture of optical lenses which has reduced amounts of entrapped gases.

It is an object of the invention to form finished optical lenses having reduced incidents of entrapped gas bubbles in the finished lenses.

It is an object of the invention to provide an improved method of manufacturing lenses by compression molding a thermoplastic material.

It is an object of the invention to provide an optical lens with improved strength.

It is an object of the invention to proved as an optical lens with decreased strain.

Other and further objects will become apparent from the specific drawings and claims.

The preferred embodiment of the present invention is illustrated in the drawings and examples. However, it should be expressly, understood that the present invention should not be limited solely to the illustrative embodiment.

DETAILED DESCRIPTION OF THE INVENTION

Figure 1A:
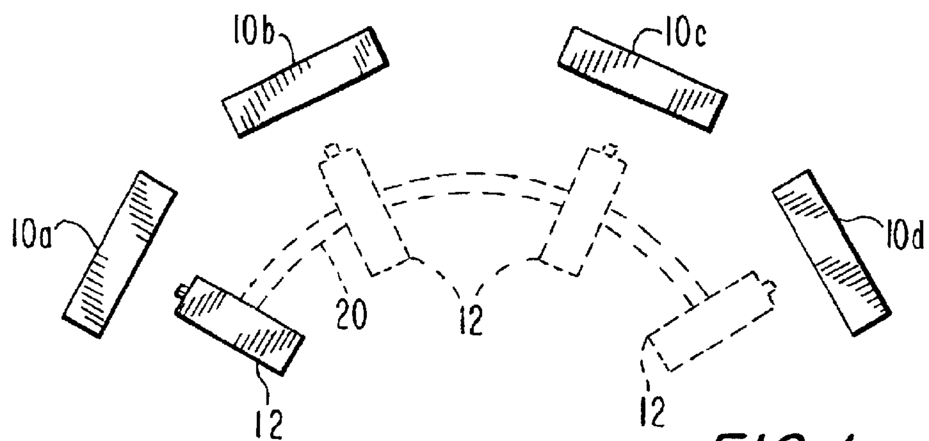
FIGS. 1*a* to 1*e* are schematic views of the apparatus for forming optical products according to the invention.
Figure 1B:
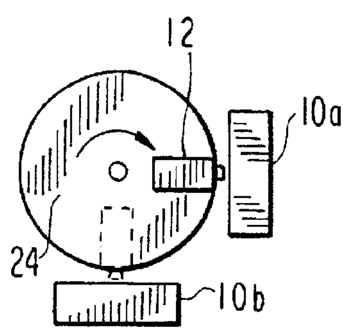
Figure 1C:
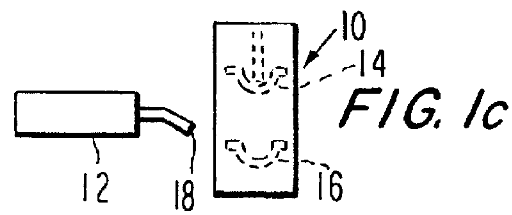

According to the invention, a preform is provided which is substantially free from dirt, entrapped air, and moisture for use in compression molding, particularly for compression molding of optical articles such as ophthalmic lenses or other optical lenses. In another aspect of the invention, a method for making a preform from thermoplastic material for use in compression molding is provided. The preform is fabricated directly in the concave mold just prior to the compression molding process. Convex and concave molds are placed in a press. Such presses are generally known in the art. The computerized press disclosed in U.S. Pat. No. 5,662,951 which is incorporated by reference is particularly useful. The molds are heated to a temperature above room temperature, desirably to about the transition temperature of the thermoplastic material, preferably within a few degrees below the transition temperature of the thermoplastic material. A thermoplastic material is heated in a reservoir to form a fluid. The thermoplastic material is desirably a thermoplastic resin material, polymethly/methacrylate, polycarbonates, polystyrene, cellulose acetate, acrylic copolymers, thermoplastic polyesters, styrene acrylonitrile (SAN), and/or mixtures thereof. Particularly, desirable thermoplastic materials for use in the preform are polycarbonate and an amorphis cyclolofin copolymer made from monomers of norborene followed hydrogenation for example Zeonor 1020 and 1060 supplied by Zeon Chemical, Louisville, Ky. (hereafter norborene copolymer). In the past, polycarbonate preforms had to be kept in an oven to draw off moisture and avoid formation of bubbles in the finished lens. Norborene copolymer preforms absorbed oxygen in storage which also caused bubbles in the finished lenses. According to the invention, a bubble free finished lens can be prepared from these materials.

According to the invention, a heated reservoir desirably a thermoplastic extruder is provided. The heated reservoir has a fluid outlet which is positioned in close proximity to the concave mold preferably as close as is reasonably practical to allow thermoplastic material to flow into the mold without building up around the outlet during dispensing. A predetermined amount of the fluid thermoplastic material preferably polycarbonate or a norborene copolymer is dispensed from the reservoir outlet onto the edge of the heated concave mold prior to the fluid solidifying so that the fluid makes point or line contact as it contacts the concave mold. Preferably the thermoplastic material is delivered to the concave mold at a point spaced from the center of the concave mold preferably at a point that is located a distance equal to or greater than one-half (½) the radius of the concave mold desirably at a distance of three-quarters (¾) of the radius or greater from the center of the concave mold. The fluid flows into the concave mold and forms a blob of material having a greater thickness at the center and a smaller diameter than the resulting molded article. The thermoplastic blob is then allowed to cool below the melting temperature of the thermoplastic material and forms a monolithic preform mass having a skin and having a flat to slightly convex surface which will make point or line contact with the upper convex mold. The formed preform is clean since it has been produced from clean thermoplastic material that has been melted in the reservoir. In addition, there are substantially no entrapped gas bubbles either from air or from water vapor in the preform. Such entrapped gases or dirt can result in a defect in the finished lens.

The reservoir outlet is located as close to the surface of the concave mold as is reasonably practical so the dispensed fluid does not build up around the outlet during dispensing. Desirably, the outlet is located one (1) inch or less above the surface of the outside edge of the concave mold. More desirably, it is located one-half (½) inch or less and most desirably it is located at about one quarter (¼) inch above the surface of the concave mold. Preferably, the outlet is oriented at an acute angle to a plane through the top of the concave mold so that the fluid leaving the outlet has a horizontal component of flow toward the center of the concave mold as well as a vertical component so that the fluid thermoplastic material will tend to flow toward the center of the concave mold once it hits the edge surface. The reservoir has a fluid volume control which can be set to dispense a predetermined amount of fluid thermoplastic.

Referring to FIGS. 1*a* to 1*e*, a plurality of compression molding machines or presses 10*a*, 10*b*, 10*c* and 10*d* are provided. The molding machines include a convex upper mold 14 and a concave lower mold 16. A heated reservoir, preferably an extruder 12, is provided having a fluid outlet 18 for dispensing fluid thermoplastic material to the concave mold 16. The extruder 12 includes a dispensing controller. The amount of thermoplastic dispensed can be controlled in a variety of ways. For example, the screw on the extruder can be driven with servomotor which is programmed to make a fixed number of revolutions to dispense the fluid thermoplastic in a mold. Alternatively, a fixed temperature and screw speed can be maintained. A fill time is then calculated. Each concave mold is then filled for the calculated time. The fluid outlet 18 is located in close proximity to the concave mold 16. Desirably, the extruder 12 is mounted on a rotating platform 24 or along an arcuate or straight track, desirably arcuate track, 20 so the outlet 18 can be positioned in close proximity to plurality of compression molding machines 10*a*, 10*b*, 10*c* and 10*d* which include a press. The compression molding machines desirably are located adjacent to one another. Desirably, the compression molding machines can be positioned in a straight row. Alternatively, as shown in FIG. 1*a* the compression molding machines 10*a* through 10*d* can be placed in an arc or a circular configuration. As shown in FIG. 1*a*, a plurality of compression molding machines, 10*a*, 10*b*, 10*c* and 10*d* are located adjacent moveable extruder 12 so that outlet 18 can be positioned in close proximity to the concave mold 16. Desirably, concave mold 16 is slidably mounted within compression molding machines 10 so that it is horizontally extendable outside of the compression molding machine 10 for filling with thermoplastic material and then retrieved back inside the machine 10 (see FIG. 1*d*). The outlet 18 in extruder 12 can then easily be moved in close proximity to the edge of the concave mold. Once the concave mold 16 has been filled with a thermoplastic material, it is retracted back inside the compression molding machine.

Desirably, the outlet 18 is located as close as is practically feasible to the concave mold 16 without fluid building up to block flow. The outlet is located from 1 to ⅛ inches above the concave mold. Desirably, it is located one half (½) inch or less and most desirably is located at about one quarter (¼) inch above the surface of the concave mold. Preferably, the outlet 18 is oriented at an acute angle A so that the fluid leaving the outlet has a horizontal component of flow as well as a vertical component so that the fluid thermoplastic material will tend to flow toward the center of the concave mold. Desirably, angle A is from 20 to 80° preferably 30 to 60° and desirably about 45°. The outlet 18 is preferably positioned adjacent an edge of the concave mold. Desirably, the outlet is located at a distance equal to about ½ the radius of the concave mold or greater from the center of the concave mold. Thus, if the mold has a diameter of 80 mm, the outlet is desirably located at 20 mm or more from the center of the mold.

Figure 6:
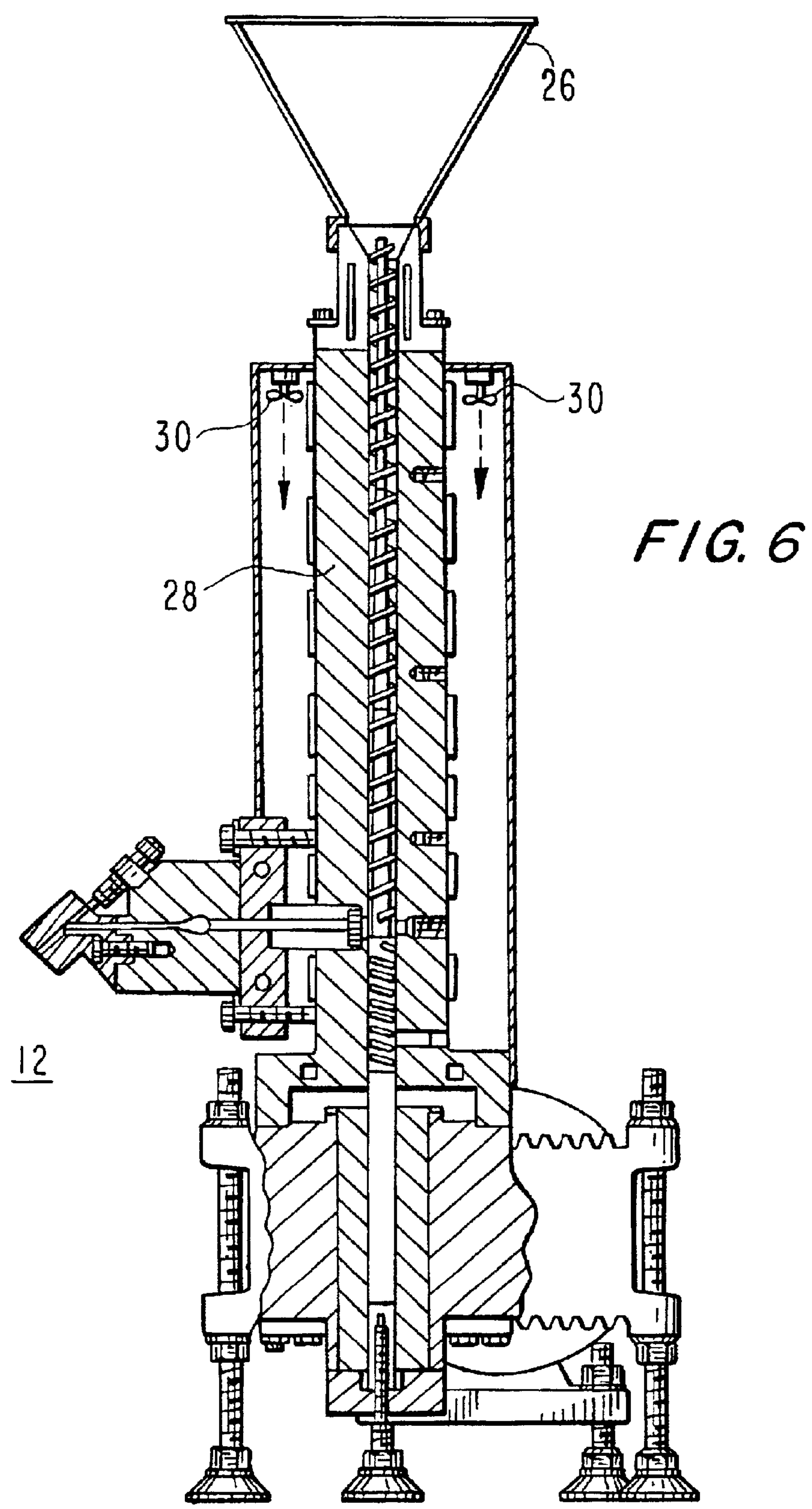
FIG. 6 is a sectional view of an extruder for use in the invention.

In operation, the heated reservoir, preferably an extruder 12 is filled with a thermoplastic material for example polycarbonate or norborene copolymer pellets through hopper 26 (see FIG. 6). The thermoplastic material is heated to at least to the transition temperature of the material for Zenor 1020 about 221° F. for polycarbonate to about 295° F. The extruder 12 is moved into position so that the outlet 18 is in close proximity to a concave mold 16 in one of the compression molding machines 10 which has been moved horizontally from within the compression molding machine 16 so that it extend outside the molding machine for easy filling with thermoplastic material. After the mold is filled, it is retracted back inside the press. The extruder outlet 18 is positioned in close proximity to an edge of the concave mold 16, preferably less than one inch above the mold and more preferably one-half (½) inch and most preferably about one quarter (¼) inch above the mold. Desirably, the outlet is spaced from the center of the mold preferably the outlet 18 is located near the outside edge of the mold 16. When the first concave mold is filled, the mold is drawn back into the compression molding machine press 10*a* and the extruder 12 is moved along the track or rotated into position to supply material to the second compression molding machine 10*b* and to the concave mold 16 which similar to 10*a* has been moved horizontally so that it extends outside the mold for easy dispensing of the fluid thermoplastic material. The remaining compression molding machines 10*b*, 10*c* and 10*d* are filled in a similar manner.

Figure 1D:
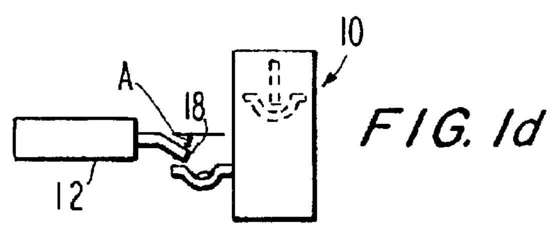
Figure 1E:
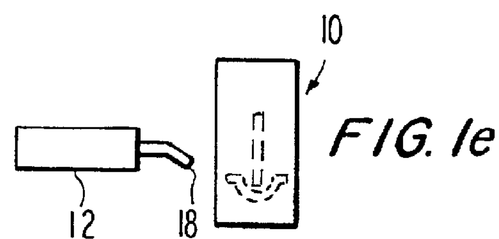

As best seen in FIG. 1*d*, outlet 18, is desirably positioned at an acute angle A, desirably 30° to 60° more desirably about 45° to the horizontal plane of the top of the concave mold 16 to impart a horizontal as well as a vertical component of flow of the fluid thermoplastic material as it hits the concave mold 16. A predetermined amount of the thermoplastic material, for example, norborene copolymer or polycarbonate is dispensed from the outlet onto the concave mold, preferably the outside edge of the concave mold. The extruder can be run at various output speeds. Desirably, the output speed and duration of flow are automatically controlled by computer. Preferably, the concave mold 16 has been heated above room temperature, desirably to about the transition temperature of the thermoplastic material, preferably the mold can be heated within 10° C. from the transition temperature, preferably from 1 to 10° C. below the transition temperature, desirably a few degrees below the transition temperature, preferably 1 to 5° C. below the transition temperature. The fluid thermoplastic material is dispensed to the edge of the concave mold prior to the thermoplastic material solidifying so that it makes point or line contact as it contacts the concave mold and then flows toward the center of the concave mold to form a blob of thermoplastic material having a greater thickness at the center of the concave mold and a smaller diameter than the resulting molded article. The blob is then allowed to cool below its melting temperature and forms a monolithic preform mass having a skin. The top of the preform mass has a flat to slightly convex surface which will make point or line contact with the convex top mold to preclude entrapment of air and the formation of air bubbles. The press is then closed and the preform mass is compressed. The formed lens is cooled; removed from the mold and edged as desired.

Figure 5:
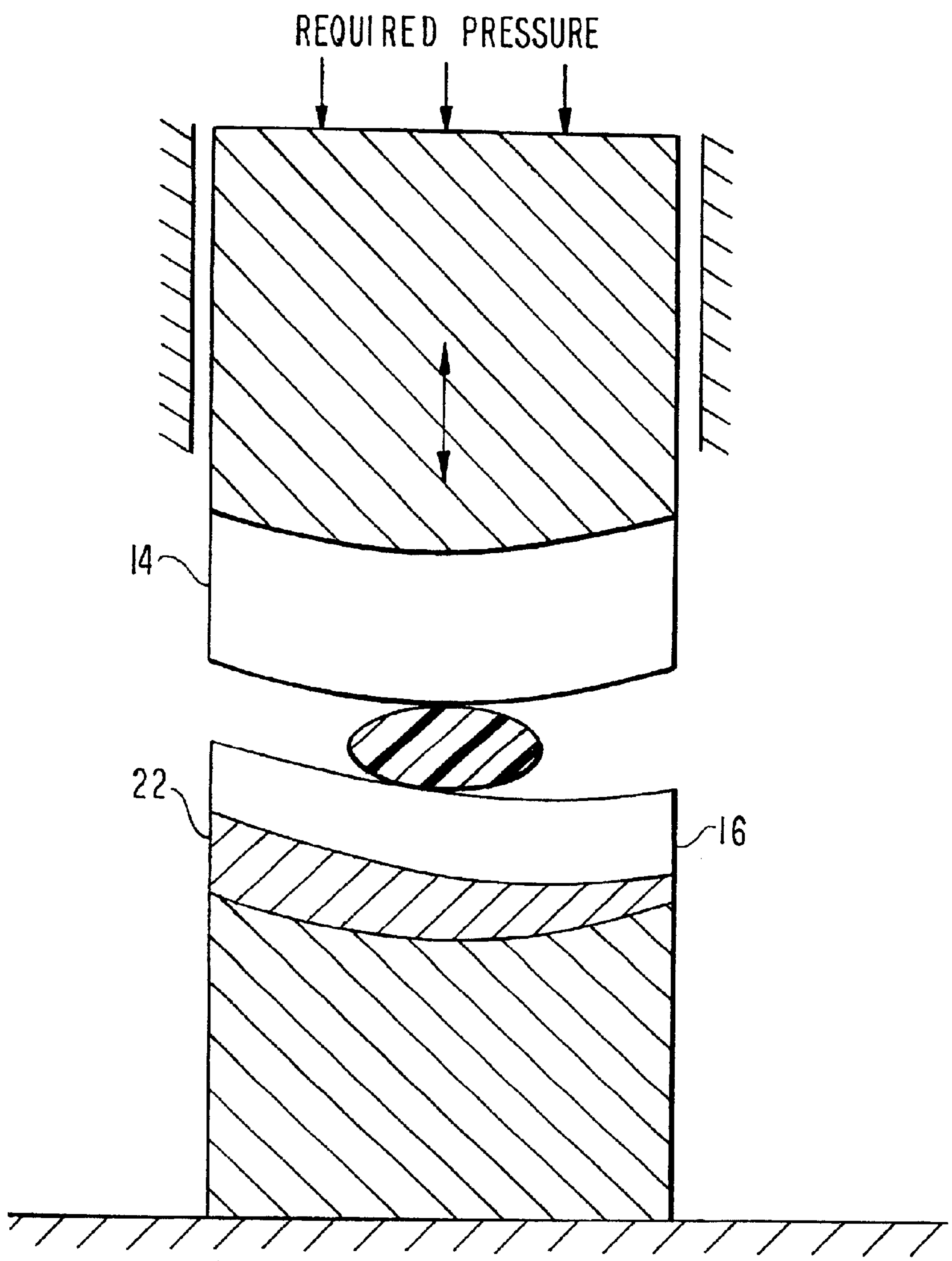

According to the invention, a number of compression molding machines 10*a*, 10*b*, 10*c* and 10*d* are provided. The number of such machine is a matter of choice in the particular set up. It is contemplated that twenty (20) or more could be used, desirably, about ten (10). The presses in the compression molding machines are set up with the specific mold configurations desired for the specific prescription. The prescription data has been inputted to a computer which will select the specific mold combinations required (see FIG. 2). The molds are then placed into the presses, either automatically or by hand. As best seen in FIG. 5, a prism ring 22 may also be included depending on the specific final lens desired. Since there are no sleeves or gasketing required, according to the invention, the prism ring can easily be added and the appropriate lens produced.

In another aspect of the invention, as best seen in FIG. 6, an extruder 12 having a cooled barrel is provided. Most extruders are designed for continuous operations. According to the invention, once all the molds have been filled, the extruder will be idle for a period of a time while the lenses are compressed and cooled. Different molds may have to be loaded into the machines depending on requirements. Thus, there can be several minutes or more delay between runs. In such instance the screw action of the extruder will be stopped. However, there is a need to prevent the material in the extruder particularly in the barrel from the degrading due to long idle periods at a high temperature for too long a period. Desirably, 28 of extruder 12 is cooled to maintain the temperature of the thermoplastic material at a temperature high enough to maintain fluidity of the material and low enough to prevent degradation. Desirably, one or more fans, preferably two (2) fans 30, are provided to cool the barrel during idle periods to a predetermined temperature described above.

Figure 2:
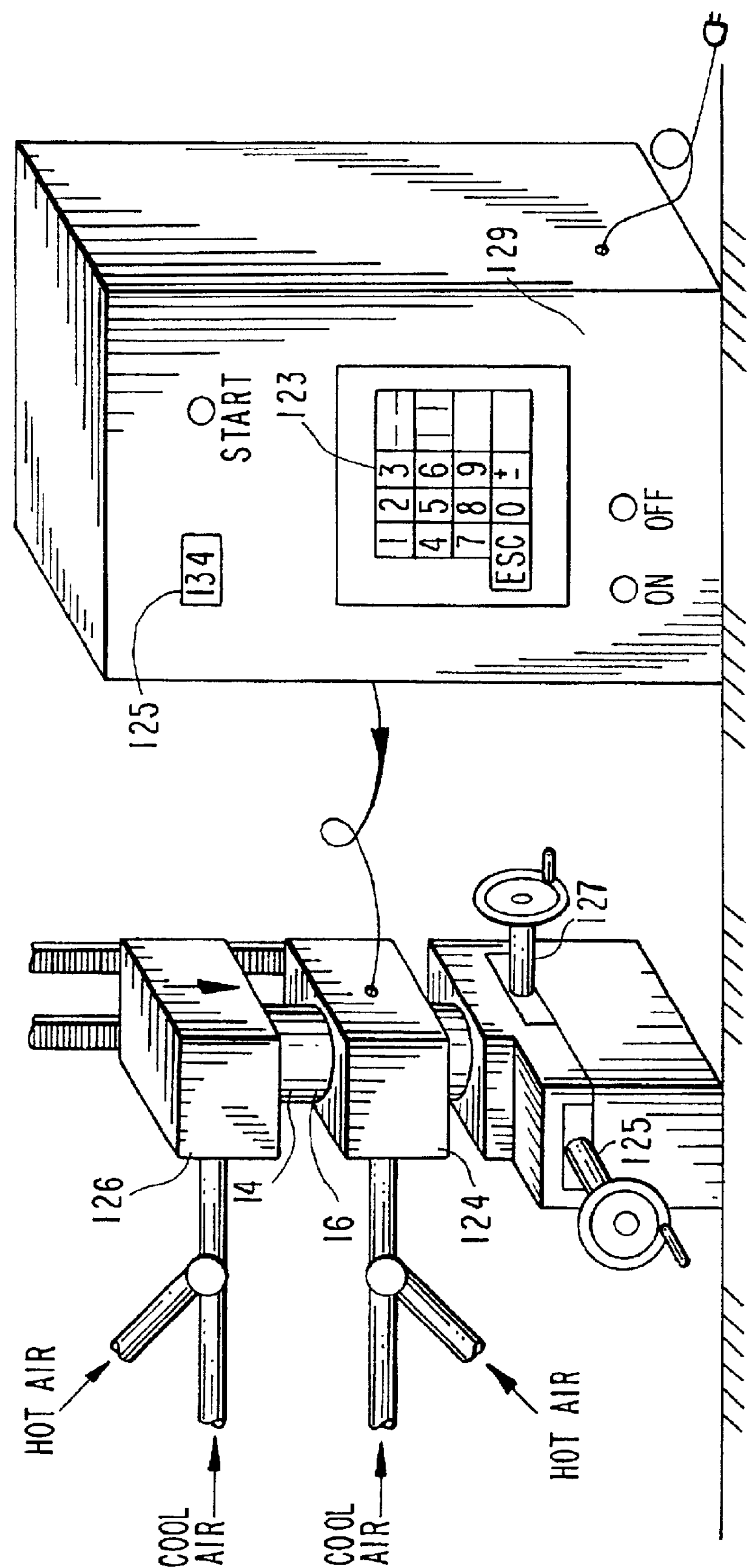
FIG. 2 is a simplified perspective view of a work station according to the invention.

Referring to FIG. 2, it will also be appreciated that the molds 14 and 16 are preferably heated by hot air using well known heating equipment designed for the rapid heating up of an object, such as a metal part. The hot air temperatures are accurately controlled by suitable temperature gauges or sensors (not shown) on the molds which are wired to the control console 129 so that same can then be observed and monitored, as is well known, and conventional in the heating art. Alternatively, the molds could also be heated by means of electric heating bands (not shown) wrapped about the molds 14 and 16 and suitably connected electrically by means of power cords of lines to a convenient power source which may also be suitably controlled by the same apparatus means. The mold being heated by a fluid may be either of the conductive or convective type. In addition to conductive heating and/or radiation heating, radiation heating may be either of the infrared or of the dielectric type. In a like manner, the molds are suitably cooled as is required for early removal of the finished lens.

For example, a conventional, and suitable control console for the heating apparatus employing hot air for the rapid temperature built up of an object's temperature, such as the molds, is made and sold by the U.S. manufacturer, identified by the tradename of Industrial Devices Corporation. A suitable temperature gauge 125, such as Model GM made by the U.S. Sensotec Company may be employed in the control console 129 (see FIG. 2). The apparatus also includes hose ducts as shown therein for funneling both the hot (and cool) air to base mounts 124 and 126 for both the upper and lower molds which are suitably secured in place and in contact with the mold bases.

Lenses produced by the novel method of the invention, and using the preformed mass of invention require no further finishing operations, other than an edge treatment, if necessary to remove any flashing, and the application of one more surface coatings, such a hard scratch resistant surface coating, and/or a tinting treatment.

A typical lens work station employing the apparatus for heating and pressing the preforms is best shown in FIG. 2. With the use of conventional or predetermined mold halves 14 and 16 for making a prescription lens, a standardized set program for corrective lenses which would include those for decentration or prism/wedge effect (movement of optical center from geometric center), and other more specialized prescriptions. The user of the method thus selects the desired thermoplastic lens material, lens characteristics and suitably places the predetermined mold halves offset in the mold base mounts, or other wise located to achieve any desired decentration or particular lens configuration desired. At least the bottom mold base mount is suitably adjustable in the X and Y directions (plane of mold) by conventional (rotatable) "lead" screw means 125 and 127, and guideways (not shown) as is well known in the art. The molds are preheated, and the machine is set up to receive the fluid thermoplastic material in the predetermined amount. With the predetermined given parameters set, the method cycle commences by pressing the start button. The predetermined amount of thermoplastic material is dispensed by the extruder. Within a few minutes the process is complete and the molds open for removal of the finished lens.

Figure 3:
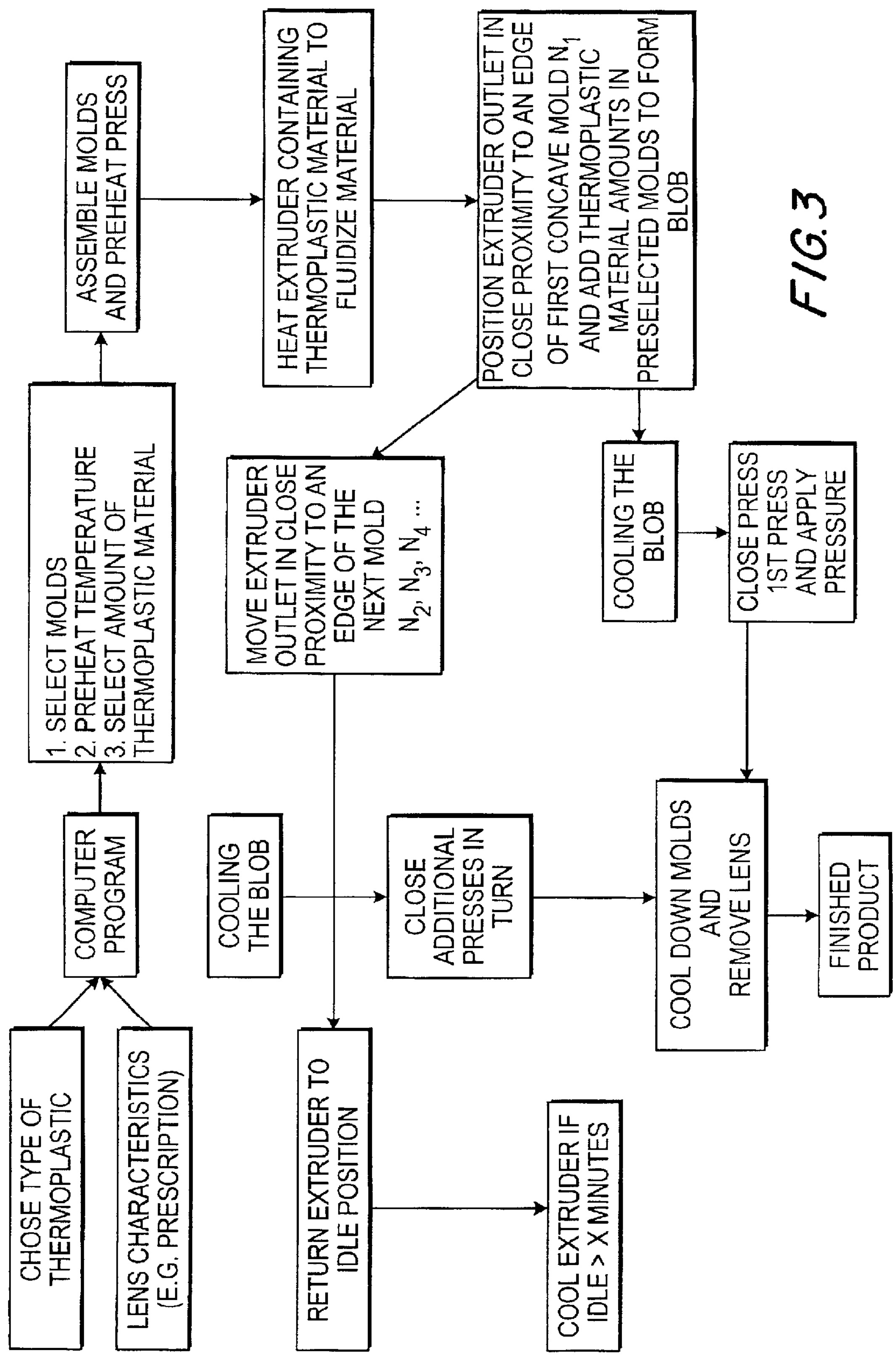
FIG. 3 is flow diagram illustrating the method of practicing the invention.
Figure 4:
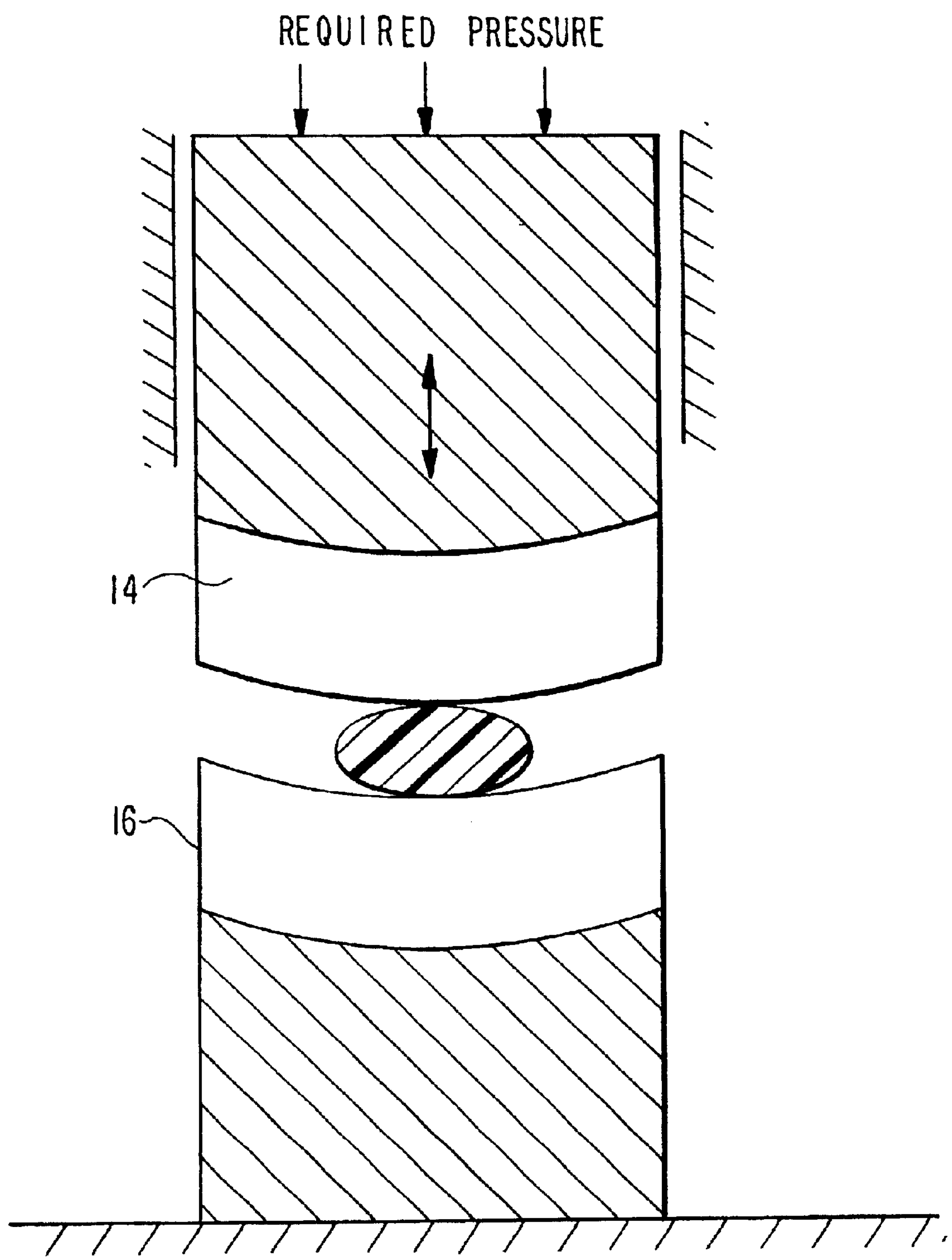
FIGS. 4 and 5 are vertical sections showing a pair of molds in operation according to the invention.

Thus, one can achieve with the novel method of the invention a finished ophthalmological lens as shown by the various method steps marked up on the flow chart of FIG. 3 for just about any type of corrective lens, be it a bifocal, monofocal, trifocal, multifocal or other type of corrective lens. The flow chart of FIG. 3 is believed to be self-explanatory and illustrates the various operative steps in practice of the method of the invention.

The resulting finished lens is substantially free of air bubbles and dirt and is substantially strain free. The resulting finished lens has improved impact resistance over injection molded lenses and reduced strain.

EXAMPLES

Example 1

Polycarbonate preforms were fabricated by extruding GE optical grade polycarbonate from a ½ inch diameter Randcastle (Cedar Grove, N.J.) extruder. At the recommended barrel temperatures of 475 to 540° F. the material extruded the preferred weight of 20 grams in 25 seconds. The nozzle was held horizontal, so the extrudate dropped vertically from a height of 3 inches onto a concave mold. A concave mold was placed under the nozzle and the material collected for 25 seconds. The material was weighed to confirm the quantity collected. A convex mold was immediately applied to a freshly formed preform and the mold assembly was compressed. Since the molds were unheated the preform compressed a significant but limited amount before it cooled to below its transition temperature. The resultant lens had an excellent surface, was strain free, but had air bubbles entrapped. The remaining preforms were demolded and examined. All had entrapped bubbles. Ten additional preforms were compression molded using the same concave mold on which the preform was formed to make a full lens. All had great optical surfaces but entrapped bubbles.

Example 2

The resultant lenses obtained by compression molding the polycarbonate preforms as fabricated in Example 1 had very acceptable optical surfaces but unacceptable entrapped bubbles. It was surmised that the entrapped bubbles could have been due to the viscosity of the polycarbonate and/or the drop of the extrudate 3 inches from the nozzle to the concave mold surface. To evaluate the former supposition, preforms were fabricated from two cyclic olefin materials: Zeonor 1020 and Zeonor 1060 from Zeon Chemical Co., Tokyo, Japan. Both materials are processed at temperatures 50 to 70 degrees Fahrenheit lower than polycarbonate. The Zeonor 1020 has a significantly lower viscosity than polycarbonate and Zeonor 1060 a somewhat lower viscosity than Zeonor 1020. Using a 1 inch diameter extruder, Zeonor 1060 was dispensed into concave molds from a distance of about 3 inches. Material was dispensed at a rate of 20 grams per 10 seconds. The extruder was purged and now Zeonor 1020 was dispensed onto concave molds, from a height of about 3 inches at the rates of 20 grams per 10 seconds and 20 grams per 5 seconds. The preforms were demolded and examined for entrapped bubbles. The results are in Table 1 as follows:

TABLE 1

| Material and | Number of bubbles per preform | | | | Percent bubble |
|---|---|---|---|---|---|
| rate of flow | 0 | 1–3 | 4–8 | >8 | free |
| 1020 - 10 second fill | 1 | 2 | 2 | 3 | 12.5% |
| 1060 - 10 second fill | 1 | 2 | 5 | 2 | 10% |
| Total | 2 | 4 | 7 | 5 | 11% |

A lens was fabricated from a Zeonor 1020 blob preform that was bubble free. It was placed between concave and convex molds and compression molded at 500 degrees Fahrenheit. The resultant lens had good surface and was entirely bubble free. When examined under polarized light the lens was found to be strain free.

Example 3

Using a 1 inch extruder Zeonor 1020 was dispensed into unheated concave molds after dropping from varying heights, and the resultant preforms were evaluated for entrapped bubble content. Nozzle heights above the mold that were evaluated were 2 inches, 1 inch, and one-quarter (¼) above the mold surface toward the edge of the mold so that the material made point contact and flowed toward the center of the mold. A full time of 10 seconds was used. The results are in Table 2 as follows:

TABLE 2

| Height of nozzle from mold | Number of bubbles per preform 0 | 1–3 | >3 | Percent bubble free |
|---|---|---|---|---|
| ¼ inch | 15 | 15 | 13 | 35% |
| 1 inch | 7 | 18 | 14 | 18% |
| 2 inches | 2 | 13 | 11 | 8% |

A lens was compression molded from a preform with no bubbles. The resultant lens was bubble-free, had good optical surfaces, and was strain-free.

Example 4 a) Preform blobs were produced in both Zeonor 1020 and polycarbonate (Bayer 001 1821) by extruding each material from separate extruders onto concave molds. The nozzle of the extruder was held within ¼ inch of the mold surface and near the edge of the mold. The molds were heated to 350 to 400 degrees Fahrenheit to facilitate the flow of the material to the center of the mold. This resulted in 95+ percent bubble-free preforms from both materials. Lenses molded from either material were bubble-free, strain-free, and had good optical surfaces.

b) 10 polycarbonate preform blobs were fabricated where the concave mold was preheated, and the extruder nozzle was 3" above the mold and directed toward the center of the mold.

Observation: The material was extremely viscous when leaving the extruder barrel. It took “significant” time to drop the 3" distance to the mold, cooling it en route. Therefore, it did not flow out smoothly on contacting the mold, but rather built up in configurations that entrap air bubbles.

Results: Preform blobs with no air bubbles: 2

Preform blobs with air bubbles: 8

Thus, only 20% of the preforms were bubble free.

Example 5

Compression molded Zeon 1020 lenses made in accordance with Example 4 and Zeon 1020 injection molded lenses were impact tested to establish their relative impact resistance. In one instance a steel ball was dropped from a height of 50 inches onto the convex surface of the lens. A group of 5 lenses, with the same Rx and same center thickness, were impacted starting with a 16 gram ball and increasing the ball weight until at least one lens failed. The results are in Table 3:

TABLE 3

| Prescription of lens | Number Tested | Number passed at 16 grams | Weight needed for failure |
|---|---|---|---|
| 1.24 mm injection molded lens | 5 | 5 | 19 grams |
| 1.23 mm injection molded lens | 5 | 5 | 22 grams |
| 1.3 mm compression molded lens | 1 | 1 | 440 grams |
| 1.4 mm compression molded lens | 4 | 4 | 761 grams |

Five compression molded lenses and 5 injection molded lenses, all of slightly differing center thickness, were tested by impacting the convex lens surface with a 1 inch diameter steel ball with substantially the same degree of force. The results are in Table 4 as follows:

TABLE 4

| Description of lens | Center thickness in inches | Number of impacts to failure |
|---|---|---|
| Injection molded lens | 0.05 | 1 |
| Injection molded lens | 0.48 | 6 |
| Injection molded lens | 0.05 | 2 |
| Injection molded lens | 0.054 | 5 |
| Injection molded lens | 0.055 | 1 |
| Average | | 3 |
| Variation | | −60% to +100% |
| Compression molded lens | 0.05 | 23 |
| Compression molded lens | 0.05 | 21 |
| Compression molded lens | 0.053 | 21 |
| Compression molded lens | 0.045 | 23 |
| Compression molded lens | 0.054 | 26 |
| Average | | 23 |
| Variation | | −9% to +8% |

The foregoing is considered as illustrative only to the principles of the invention. Further, since numerous changes and modification will occur to those skilled in the art, it is not desired to limit the invention to the exact construction and operation shown and described above, and accordingly, all suitable modifications and equivalents may be resorted to, falling within the scope of the invention.

What is claimed is:

1. A method for making a preform from thermoplastic material for use in making a compression molded optical product comprising:

a) placing a convex and a concave mold in a press;

b) heating a thermoplastic material in a reservoir to form a fluid;

c) heating said molds to a temperature above room temperature;

d) said reservoir having a fluid outlet located in close proximity to said concave mold;

e) dispensing a predetermined amount of said fluid thermoplastic material from said outlet onto the outside edge of concave mold at a point spaced one-half (½) the radius or greater from the center of said heated concave mold prior to said fluid solidifying so that said fluid makes point or line contact as it contacts the concave mold and flows into said concave mold to form a blob of thermoplastic material having a greater thickness at the center of said concave mold and a smaller diameter than the resulting molded article;

f) allowing said blob to cool to below its melting temperature thereby converting the material to a monolithic preform mass having a skin and having a flat to slightly convex surface which will make point contact with the convex mold to preclude the entrapment of air and formation of air bubbles in a finished compression molded final finished product.

2. The method according to claim 1 wherein said heated reservoir is an extruder said extruding having a barrel; said fluid outlet located in said barrel.

3. The method according to claim 2 wherein said outlet is located 1 inch or less above said concave mold.

4. The method according to claim 2 wherein said outlet is located at 0.5 inch or less above said concave mold.

5. The method according to claim 2 wherein said outlet is located about 0.25 inch above said concave mold.

6. The method according to claim 2 wherein said outlet is located about 0.5 to 0.125 inches above said concave mold.

7. The method according to claim 2 wherein said extruder includes a temperature controller to regulate the temperature of said barrel.

8. The method according to claim 6 wherein said extruder has an idle setting wherein the barrel of said extruder is cooled to prevent heat degradation of said thermoplastic material when said extruder is not in use.

9. The method according to claim 1 wherein said thermoplastic material is norborene copolymer.

10. The method according to claim 1 wherein said thermoplastic material is polycarbonate.

11. The method according to claim 1 wherein said molds are heated to within a few degrees of the transition temperature of the thermoplastic material.

12. The method according to claim 1 wherein said molds are heated to a temperature of about 1° to 10° C. below the transition temperature of the thermoplastic material.

13. The method according to claim 1 wherein said molds are heated to a temperature of about 1° to 5° C. below the transition temperature of the thermoplastic material.

14. The method according to claim 1 wherein said molds are heated to about the transition temperature of the thermoplastic material.

15. The method according to claim 3 wherein said concave said concave mold is mounted on a horizontally movable tray so that said concave mold can be moved outside of said press during dispensing of said thermoplastic material.

16. The method according to claim 3 wherein said optical product is an optical lens.

17. The method according to claim 16 further comprising an extruder containing said reservoir; said extruder having a barrel having said fluid outlet.

18. The method according to claim 17 wherein said barrel is movable so that said outlet can be positioned in close proximity to said concave mold.

19. The method according to claim 18 further comprising said extruder including a temperature regulator on said barrel to lower the temperature of said barrel when said extruder is idle.

20. An improved method for the rapid on-site making of a lens in a few minutes from thermoplastic material comprising the steps of:

a) placing a convex and concave lens mold in a press;

b) heating said molds to a temperature above room temperature;

c) heating a thermoplastic material in a reservoir to form a fluid;

d) said reservoir having a fluid outlet located in close proximity to an outer edge of said concave mold;

e) dispensing a predetermined amount of said fluid thermoplastic material from outlet onto the outer edge of concave mold prior to said fluid solidifying so that said fluid makes point contact as it first contacts the concave mold and flows into said concave mold to form a blob of thermoplastic material having a greater thickness at the center of said concave mold than at the periphery of said concave mold;

f) allowing said blob to cool to below its melting temperature thereby converting the material to a monolithic preform mass having a flat to slightly convex surface which will make point contact with the convex mold to preclude the entrapment of air and formation of air bubbles in the finished lens;

g) closing and pressing said lens molds toward each other and against said preform mass so as to mash down said preform mass;

h) continuing to heat said molds until said preform mass reaches a temperature at which said preform mass; is almost flattened out between said molds;

i) maintaining said temperature and maintaining pressure on said molds until said preform mass is reconfigured and/or transformed by compression molding into a lens defined by said pair of molds with any excess preform material expelled from between said pair of molds; and j) terminating the heating of said molds and thereafter removing a formed lens from said pair of molds.

21. The method according to claim 20 wherein said fluid is thermoplastic material introduced into said concave mold at a point near the edge of said concave mold so that said fluid flows toward the center of the mold.

22. The method according to claim 20 further comprising cooling said molds after said preform mass has been reconfigured and/or transformed.

23. The method according to claim 20 further comprising in;

a) said concave mold is mounted on a horizontally movable tray so that said concave mold can be moved outside of said press during dispensing of said thermoplastic material.

24. The method according to claim 20 further comprising said extruder including a temperature regulator on said barrel to lower the temperature of said barrel when said extruder is idle.

* * * * *